(12) United States Patent
Darnton et al.

(10) Patent No.: US 7,731,873 B2
(45) Date of Patent: Jun. 8, 2010

(54) CONTACT LENS MOLD ASSEMBLIES AND SYSTEMS AND METHODS OF PRODUCING SAME

(75) Inventors: Sarah E. Darnton, Southampton (GB); Neil G. Goodenough, Southampton (GB); Richard C. Rogers, Chandler's Ford (GB)

(73) Assignee: CooperVision International Holding Company, LP, St. Michael (BB)

( * ) Notice: Subject to any disclaimer, the term of this patent is extended or adjusted under 35 U.S.C. 154(b) by 849 days.

(21) Appl. No.: 11/200,648

(22) Filed: Aug. 9, 2005

(65) Prior Publication Data

US 2007/0035051 A1    Feb. 15, 2007

(51) Int. Cl.
*B29D 11/00* (2006.01)
*G02B 1/08* (2006.01)

(52) U.S. Cl. .................. 264/1.38; 264/1.36; 264/2.5; 264/442; 264/494; 425/808

(58) Field of Classification Search .................. 425/808
See application file for complete search history.

(56) References Cited

U.S. PATENT DOCUMENTS

| | | | |
|---|---|---|---|
| 3,935,291 A | 1/1976 | Jackson | |
| 4,592,887 A | 6/1986 | Bando et al. | |
| 4,761,069 A | 8/1988 | Truong et al. | |
| 4,872,405 A | 10/1989 | Sterman | |
| 5,114,455 A | 5/1992 | Hirota et al. | |
| 5,120,499 A | 6/1992 | Baron | |
| 5,135,686 A | 8/1992 | Masuhara et al. | |
| 5,158,718 A | 10/1992 | Thakrar et al. | |
| 5,204,126 A | 4/1993 | Singh et al. | |
| 5,252,056 A | 10/1993 | Hörner et al. | |
| 5,407,627 A | 4/1995 | Schiller et al. | |
| 5,466,147 A | 11/1995 | Appleton | |
| 5,540,410 A | 7/1996 | Lust et al. | |
| 5,593,620 A | 1/1997 | Galas | |
| 5,648,024 A | 7/1997 | Galas | |
| 5,658,602 A | 8/1997 | Martin et al. | |
| 5,681,138 A * | 10/1997 | Lust et al. ................. | 414/752.1 |

(Continued)

FOREIGN PATENT DOCUMENTS

EP     0 528 664 A1     2/1993

(Continued)

OTHER PUBLICATIONS

U.S. Appl. No. 11/200,848, filed Aug. 9, 2005.

(Continued)

*Primary Examiner*—Richard Crispino
*Assistant Examiner*—William P Bell (57) ABSTRACT

Methods and apparatus are provided for making an ophthalmic lens. Apparatus are provided for filling contact lens shaped cavities of contact lens molding assemblies. Methods of coupling and fusing contact lens mold sections are also provided and generally include providing first and second mold sections which, when coupled together, are effective to form a lens-shaped cavity and contact regions between the mold sections. One or both of the mold sections may include one or more recessed regions or projections which provide areas of non-fusion and areas of fusion, respectively, when the mold sections have been filled with a contact lens precursor material and are fused together, for example, by focused ultrasound energy.

7 Claims, 8 Drawing Sheets

U.S. PATENT DOCUMENTS

| | | |
|---|---|---|
| 5,759,318 A | 6/1998 | Galas |
| 5,804,107 A * | 9/1998 | Martin et al. ............... 264/1.36 |
| 5,850,107 A | 12/1998 | Kindt-Larsen et al. |
| 6,033,603 A | 3/2000 | Lesczynski et al. |
| 6,039,899 A | 3/2000 | Martin et al. |
| 6,180,032 B1 | 1/2001 | Parnell, Sr. et al. |
| 6,257,547 B1 | 7/2001 | Togo et al. |
| 6,310,116 B1 | 10/2001 | Yasuda et al. |
| 6,315,929 B1 | 11/2001 | Ishihara et al. |
| 6,359,024 B2 | 3/2002 | Lai |
| 6,405,993 B1 | 6/2002 | Morris |
| 6,444,145 B1 | 9/2002 | Clutterbuck |
| 6,465,538 B2 | 10/2002 | Lai |
| 6,475,410 B1 | 11/2002 | Nakagawa |
| 6,511,617 B1 | 1/2003 | Martin et al. |
| 6,551,531 B1 | 4/2003 | Ford et al. |
| 6,565,776 B1 | 5/2003 | Li et al. |
| 6,592,356 B1 | 7/2003 | Lust et al. |
| 6,627,124 B1 | 9/2003 | Herbrechtsmeier et al. |
| 6,638,451 B1 | 10/2003 | Hagmann et al. |
| 6,719,929 B2 | 4/2004 | Winterton et al. |
| 6,732,993 B2 | 5/2004 | Dean |
| 6,790,873 B2 | 9/2004 | Tomono et al. |
| 6,872,335 B2 | 3/2005 | Su et al. |
| 2002/0020634 A1 | 2/2002 | Fortune |
| 2002/0137811 A1 | 9/2002 | Turek et al. |
| 2002/0163619 A1 | 11/2002 | Matsuzawa et al. |
| 2003/0062640 A1 | 4/2003 | Ansell et al. |
| 2003/0108637 A1 * | 6/2003 | O'Dunlaing et al. ........ 425/453 |
| 2003/0134132 A1 | 7/2003 | Winterton et al. |
| 2003/0160343 A1 | 8/2003 | Hodgkinson |
| 2003/0164562 A1 | 9/2003 | Li et al. |
| 2003/0164563 A1 | 9/2003 | Calvin et al. |
| 2003/0197833 A1 | 10/2003 | Hiratani et al. |
| 2003/0203066 A1 | 10/2003 | Lust et al. |
| 2004/0000732 A1 | 1/2004 | Spaulding et al. |
| 2004/0075182 A1 | 4/2004 | Gobron |

FOREIGN PATENT DOCUMENTS

| | | |
|---|---|---|
| EP | 0 908 476 A2 | 4/1999 |
| EP | 1 352 736 A2 | 10/2003 |

OTHER PUBLICATIONS

U.S. Appl. No. 11/200,644, filed Aug. 9, 2005.
U.S. Appl. No. 11/201,410, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.

* cited by examiner

CONTACT LENS MOLD ASSEMBLIES AND SYSTEMS AND METHODS OF PRODUCING SAME

The present invention generally relates to devices, systems, and methods for producing contact lenses, such as silicone hydrogel contact lenses, or contact lenses that comprise a silicone hydrogel material. More particularly, the invention relates to systems for providing polymerizable compositions to mold sections systems for fusing mold sections together to form mold assemblies, and mold assemblies produced therefrom.

BACKGROUND

One method of manufacturing ophthalmic lenses, such as intraocular lenses and contact lenses, is by cast molding.

Cast molding of contact lenses is well known. See, for example, Appleton, et al., U.S. Pat. No. 5,466,147, Morris, U.S. Pat. No. 6,405,993, and Dean, U.S. Pat. No. 6,732,993.

Typically, a single mold assembly for molding a single contact lens product includes a female mold section having a concave optical surface defining an anterior surface of a lens to be made, and a male mold section having a convex optical surface defining a posterior surface of the lens to be made. Thus when the male and female mold sections are assembled together, a contact lens shaped cavity is formed between the concave surface of the female section and the convex surface of the male section.

The female and male mold sections are commonly produced by injection molding techniques. A common method of forming a lens mold section is to utilize metal tooling insert, which has typically been machine lathed to define a desired contact lens surface, to form the molding surface of the mold section.

A process for cast molding a lens is as follows. A polymerizable lens material, for example, a monomeric material or other lens precursor material is placed on a concave surface of a contact lens mold section. This is usually done by manually withdrawing the lens precursor material from a large volume container containing the precursor material with an Eppendorf tube and dispensing a volume of the precursor material onto a mold or mold section. Typically, a person would fill the Eppendorf tube with the material and dispense between about 30 μL and about 50 μL onto the concave surface of the mold section. This method is labor intensive, presents substantial risks to people handling the precursor material, and can result in increased waste of the precursor material since large volumes of the material remain in the jar for extended periods of time, which can degrade or deteriorate over time.

Once filled, a second mold section is placed on top of the first mold section to form a lens shaped cavity containing the lens precursor material. The contact lens precursor material is cured for example, by applying heat and/or light or other suitable polymerizing means to the filled mold assembly, thereby producing a contact lens product or contact lens between the mold sections. The contact lens product is then removed from the mold sections. The mold sections are often destroyed during this removal step. The contact lens product is often an unfinished contact lens which is subjected to one or more finishing steps, for example, conventional finishing steps such as hydration, to produce the final contact lens.

One obstacle associated with cast molding processes is the appropriate placement and fixation of the mold sections, particularly after the lens precursor material has been placed between the mold sections and prior to polymerization thereof. For example, it may be difficult to secure two mold sections together to form a mold assembly without opacification, pitting, or bubble formation in the lens cup (e.g., the region of the mold section containing the lens precursor material). Further, it may also be difficult to form a mold assembly in which the lens precursor material has a substantially uniform thickness, or in other words the lens does not have an undesired prism due to thickening of the lens precursor material at one region of the lens cup relative to another different region.

In addition, because of the potentially fragile nature of the polymerized contact lens product, the mold sections should be separable without causing breakage of or damage to the lens product.

A variety of traditional methods are used in a non-automated production laboratory setting for placing one mold section upon another and then securing the two sections in a relatively fixed position such as by weighting or clamping. While this may be a somewhat acceptable practice on a small scale production basis, it may not satisfy all of the requirements of large scale and/or automated high speed manufacturing production of contact lenses.

Directed energy techniques, such as ultrasonic welding are known in the art for permanently joining materials such as polymers without consideration for later separation.

Galas, U.S. Pat. No. 5,759,318, describes an apparatus and method that includes the use of ultrasonic energy for releasably fixing assembled sections of a lens molding assembly using a ultrasonically produced annulus of fusion completely circumscribing the contact lens forming material contained between the assembled sections.

More effective, more reliable methods and systems for manufacturing lenses, for example filling and coupling mold sections during manufacturing of contact lenses, are needed.

SUMMARY OF THE INVENTION

The present systems and methods are directed to filling individual contact lens mold sections with a contact lens precursor material, for example, a light initiated polymerizable composition, closing the filled mold sections with another mating mold section, and causing the assembled mold sections to become fused together such that the filled and assembled mold sections remain fixed during one or more downstream contact lens manufacturing steps.

The systems and methods are suitable for automated manufacture of contact lenses, such as silicone hydrogel contact lenses, including daily wear and extended or continuous wear lenses. For example, the present systems can fill contact lens mold sections using an assembly including a removable, replaceable UV blocking reservoir that holds a relatively large amount of contact lens precursor materials, and a dispense mechanism directly connected to the reservoir that holds a relatively smaller amount of the contact lens precursor materials. The reservoir may be the barrel of a syringe. A diaphragm valve may be operably located between the reservoir and the dispense assembly. The dispense mechanism includes a dispense tip. A conveyor is provided for passing unfilled mold sections beneath the dispense mechanism. A stepper motor may be used to cause the dispense mechanism to automatically dispense a substantially precise and accurate amount of precursor composition from a dispense tip into each desired lens cup that passed beneath the dispense tip. When the dispense apparatus is empty, a valve is opened between the reservoir and dispense mechanism connected thereto to refill the dispense mechanism. When the reservoir itself becomes empty, the reservoir can be easily and quickly replaced by a filled reservoir.

Accordingly, in a broad aspect of the invention, methods and systems for making lenses, for example silicone hydrogel lenses, such as contact lenses, are provided.

In accordance with various aspects of the present invention, lens shaped cavities of contact lens mold sections are filled with polymerizable materials, the filled mold sections are assembled with mating contact lens mold sections, and the assembled mold sections are secured together to form a mold assembly. In certain embodiments, the mold sections are fused or welded together using vibrational energy, such as ultrasonic energy to form a non-annular or non-continuous circumferential welding site around the polymerizable material. In other embodiments in which non-ultrasonic methods and devices are used to form mold assemblies, the mold sections can be coupled together in a continuous annular ring.

The contact lens mold sections each comprise a lens shaped portion or surface(s) and a flange region circumscribing the lens shaped portion or surface(s). For example, a mold assembly for forming a contact lens may comprise first and second mold sections, wherein the first mold section includes a generally concave lens shaped surface defining an anterior surface of a contact lens, and the other of the mold sections includes a generally convex lens shaped surface defining a posterior surface of a contact lens. When coupled together, the first and second mold sections form a lens-shaped cavity between the lens shaped surface of the first mold section and the lens shaped surface of the other mold section, and one or more regions where surfaces of the flanges of the assembled mold sections are in contact with one another. In accordance with an embodiment of the invention, first and second mold sections are provided which, when coupled together, form non-circumferential contact regions along the flanges and one or more gaps separating the non-circumferential contact regions.

In an especially advantageous embodiment of the invention, at least one of, preferably both of, the first and second mold sections are "universal" mold sections. In other words, each of the first mold section and the second mold section may be substantially identical, such as having less than about a 5% difference in weight or radius, or other property to one another. In this embodiment, the mold sections each includes both a first lens shaped surface defining an anterior surface of a contact lens and a substantially opposing second lens shaped surface defining a posterior surface of a contact lens.

For forming a contact lens in accordance with the invention, a polymerizable composition is deposited on the concave lens shaped surface of individual mold sections as a plurality of such mold sections are moved along a production line. The polymerizable composition may comprise a contact lens precursor material having at least one monomeric component, for example, a silicon containing monomeric component.

In accordance with one aspect of the invention, dispense apparatus are provided which are useful in providing a polymerizable composition to a lens shaped surface of a contact lens mold section. The dispense apparatus generally comprises a dispensing unit having a dispense tip sized to dispense an amount of a polymerizable composition to a mold section or a portion thereof, and a syringe assembly structured to contain a quantity of the polymerizable composition and being couplable to and uncouplable from the dispensing unit. The dispensing unit may include a diaphragm valve. The syringe assembly is structured to provide the polymerizable composition to the dispensing unit when directly coupled thereto.

In some embodiments, the dispense apparatus includes a control assembly operatively coupled to the dispensing unit and structured to control dispensing of the polymerizable composition through the dispense tip. Preferably, the dispense apparatus further comprises a fitting located between and connecting the dispensing unit and the syringe assembly. The fitting is structured and positioned to facilitate coupling and uncoupling of the syringe assembly and the dispensing unit. The fitting may comprise an elbow shaped conduit.

The syringe assembly may comprise a barrel suitable for holding a polymerizable composition and a piston positioned and movable within the barrel. In some embodiments, the barrel includes a hollow space having a volume, or a capacity, in a range of between about 20 cc and about 200 cc, or between about 40 cc and about 100 cc. In a specific embodiment, the barrel holds about 55 cc of a polymerizable composition.

In some embodiments, the syringe assembly, fitting, and/or dispensing unit preferably comprise one or more materials effective to block the passage of polymerizing radiation, for example, light effective to cause or initiate polymerization of the polymerizable composition contained in or passing through the dispense apparatus. For example, the syringe assembly, fitting and/or dispensing unit may comprise a material effective to substantially block the passage of ultraviolet light.

Once the mold section has been filled with the polymerizable composition, a mating mold section is placed onto the filled mold section to form a contact lens mold assembly.

In another aspect of the invention, methods and systems are provided for joining, for example, causing fusion between, the coupled mold sections.

In a preferred embodiment, the mold sections are structured so that the assembled mold sections can be fused together using vibrational energy, for example, ultrasonic energy. In accordance with one aspect, focused ultrasonic energy is radiated by means of an ultrasonic horn into regions of contact at the mating mold section flanges.

The mold sections may comprise materials that can be effectively joined using such focused ultrasound energy. In some embodiments, the mold sections comprise polyethylene vinyl alcohol (EVOH) which is a material suitable for ultrasonic welding. It is to be appreciated that other materials may be used for making the lens mold sections of the present invention. For example, materials useful in the present invention include polymeric materials, for example thermoplastic polymeric materials, for example, amorphous polymeric materials such as polystyrene, polycarbonate, acrylonitrile/butadiene/styrene compositions, cyclic olefin co-polymers, acrylics and/or polysulfone. Semicrystalline resins such as acetal, polypropylene, polyethylene, nylon, polyethylene terephthalate, polyether ether ketone, other polyolefins and liquid crystal polymers are also suitable. In certain materials, one or more additives may be provided in the mold section to enhance properties of the contact lenses. Advantageously, mold sections which comprise EVOH do not require additives such as wettability enhancing agents, and the like.

Other methods of the invention may employ directing different types of energy into the mold assemblies to cause fusion of the mold sections, for example, focused infrared radiation, radio frequency energy, and/or other frictional forms of heating. In addition, in certain embodiments, the mold sections may be held together using alternate devices or methods, such as by mechanical clamping using plates or other suitable structures, or by providing an interference fit between male and female mold sections. In embodiments which employ ultrasonic energy, the fusion or welding is not in a continuous ring around the lens cup of the mold section. In embodiments which use a non-ultrasonic energy coupling technique, the contact between the male and female mold sections can be continuous around the lens cup.

In some embodiments, the mold sections are structured to facilitate fusion of the coupled mold sections.

For example, the mold sections may include one or more longitudinally extending projections located radially outwardly of the lens shaped surface. In some embodiments, the at least one longitudinally extending projection is located radially outwardly of only a portion of the lens shaped surface of the mold section. For example, the projections may comprise a plurality of longitudinally extending projections, for example three or more longitudinally extending projections, the projections being circumferentially spaced apart, for example equidistantly circumferentially spaced apart, from each other.

In other embodiments, the at least one projection comprises a substantially entirely annular projection substantially entirely circumscribing the lens shaped surface of the first mold section.

The projections are effective in facilitating fusion of the mold sections by providing discrete contact regions between the mold section to which vibrational energy will be effectively focused.

Other embodiments of the mold sections may include one or more recesses located in a portion of the mold section. For example, a flange of the mold section may comprise a plurality of recesses spaced radially outward from the lens cup. When a portion of the mold section, such as a ridge portion, is in contact with the flange surface that has the recesses located therein, ultrasonic joining of the flange surface to the ridge portion provides a non-continuous contact region around the perimeter of the lens cup even when using a ultrasonic device having an annular ultrasonic delivery device, such as a continuous or annular ultrasonic horn.

Methods of the invention may include the step of causing the first mold section and the second mold section to be coupled together so that the projection or projections is or are in close proximity to, or in direct contact with, the second mold section. According to some embodiments, the coupled mold sections are fused at least a portion of the projection or projections to form at least one fused region between the first and second mold sections.

Advantageously, the fused region or regions hold the mold sections together sufficiently securely to enable the mold assembly to be subjected to one or more post-fusion procedures without the mold assemblies becoming inadvertently misaligned or separated. Such post-fusion procedures may include, for example, subjecting the mold assembly to polymerizing radiation to polymerize the lens precursor material in the lens shaped cavity, and mechanical lifting and other transport of the mold assembly between various post-fusion processing stations.

For example, once the mold sections have been filled, assembled and joined, the polymerizable composition in the lens-shaped cavity of the mold assembly is caused to polymerize to form a polymerized contact lens product. In some embodiments, the step of causing the polymerizable composition to polymerize comprises exposing the filled mold assembly to polymerizing light, for example, ultraviolet light. The mold sections may then be decoupled or separated to expose the contact lens product, for example, by passing a cutting device, for example a blade, through the fused region or regions and removing one of the mold sections from the contact lens product.

As discussed herein, in a particularly advantageous embodiment of the invention, the flange region of the mold sections includes one or more recessed regions, preferably at least one non-circumferential recessed region that does not extend the full circumferential length of the flange. For example, three spaced apart recessed regions may be provided along a circumferential surface of the flange.

Such recessed regions may be provided in addition to, or as a substitute for, the longitudinally extending projections.

Typically, in accordance with the invention, whereas the projections are preferably provided on the lens shaped surface side of the mold section, the recessed regions are provided on the side of the mold section opposing the lens shaped surface side of the mold section. For example, a projection, such as an annular ridge, may be provided on an upper surface of a flange of the mold section around the lens cup portion, and the recesses may be provided on a lower surface of the flange of the mold section.

When two of such mold sections having such recessed regions are assembled together to form a mold assembly, the recessed regions provide gaps dividing contact region between the mold sections. Although not wishing to be bound by any specific theory of the invention, the gaps may be advantageous in preventing cavitation of unpolymerized lens material during the ultrasonic fusion step, possibly by allowing gasses to escape from between interfacing, unfused flange surfaces. Other benefits may also be achieved by the presence of gaps in the contact regions.

In a further aspect of the present invention, devices useful in fusing together coupled contact lens mold sections are provided. The devices generally comprise an energy assembly structured to be effective to provide vibrational energy, for example ultrasound energy, and a contact assembly operatively coupled to the energy assembly and effective to transfer the vibrational energy from the energy assembly into assembled first and second mold sections to cause fusion therebetween.

More specifically, the contact assembly may comprise an ultrasound horn including a distal end structured to contact one or more discrete, spaced apart portions of a circumferential area of one of the mold sections around the lens shaped cavity. For example, the distal end of the ultrasound horn may include a plurality of distally projecting regions, for example, about three or more distally projecting regions. In some embodiments of the invention, the distal end of the contact assembly may be described as having a somewhat "castellated" appearance, in that the distal end has a configuration defined by multiple projecting regions, for example, rectangular shaped projecting regions, separated by recessed notches. The ultrasound horn radiates ultrasound energy into the mold assembly at interfaces of the projecting regions and the mold assembly coupled thereto, causing fusion between mold sections at a plurality of discrete spaced apart locations within the mold assembly.

However, as discussed herein, other ultrasonic devices can have a continuous annular ring ultrasonic horn, or an ultrasonic horn having a planar distal end surface, and still achieve a desired non-continuous fusion between the mold sections due to the presence of the recesses described herein.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects of the present invention are apparent in the following detailed description and claims, particularly when considered in conjunction with the accompanying drawings in which like parts bear like reference numerals.

BRIEF DESCRIPTION OF THE DRAWINGS

FIGS. 9A and 9B are a top view and cross-sectional view, respectively, of a molding assembly in accordance with an embodiment of the invention, wherein the molding assembly includes a pair of mold sections each having three spaced apart projections providing regions of fusion between the mold sections, wherein regions of fusion are indicated by dashed lines in FIG. 9a.

DETAILED DESCRIPTION

The present invention will typically be described herein with respect to methods and systems useful for the manufacture of contact lenses, though it is to be appreciated that, with appropriate modification thereto, the present methods and systems may be useful for the manufacture of other types of ophthalmic lenses and other light-polymerizable articles in general. In a preferred embodiment, the present systems, methods, and components thereof are useful in manufacturing silicone hydrogel contact lenses, or contact lenses that comprise a silicone hydrogel material. For example, the present systems, methods, and components thereof may be particularly useful in producing extended wear silicone hydrogel contact lenses, and/or daily wear silicone hydrogel contact lenses.

In a broad aspect of the invention, methods of making contact lenses are provided, the methods generally comprise at least one of the following steps of providing first and second mold sections, each mold section including a lens shaped surface, the first and second mold sections being structured to be coupled or placed together to form a lens-shaped cavity therebetween, providing a polymerizable composition in the lens shaped cavity of one mold section, causing the first and second mold sections to be coupled or placed together, fusing the coupled first and second mold sections together, and causing the polymerizable composition in the lens-shaped cavity to polymerize to form a lens shaped product.

Figures 1, 1A, 1C:
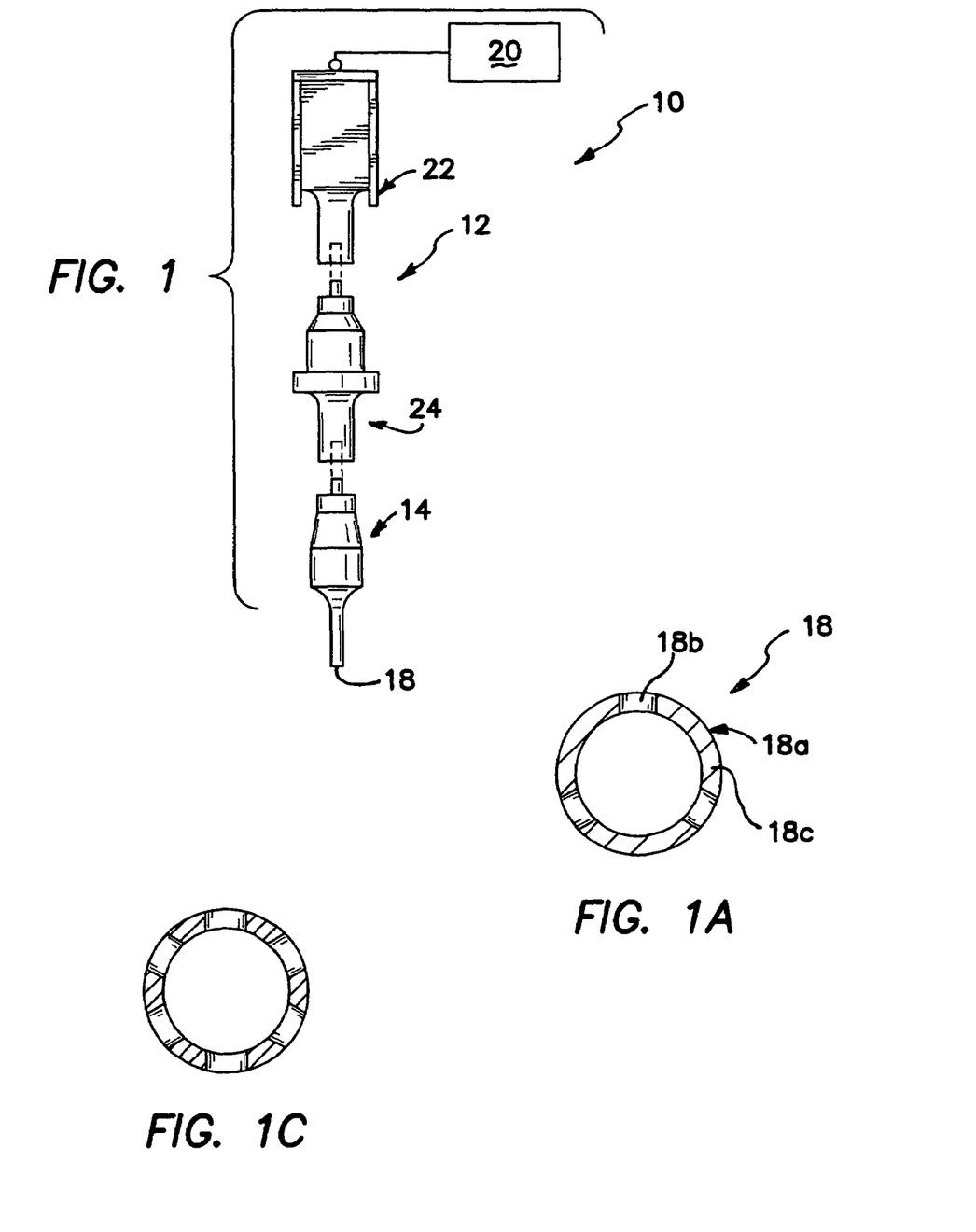
FIG. 1 is a schematic exploded diagram showing a device in accordance with the invention useful for fusing two contact lens mold sections together.
FIG. 1A is a plan view of a distal end of the device shown in FIG. 1.
FIG. 1C is a plan view of an alternative distal end of the device shown in FIG. 1.

Turning now to FIG. 1, a method in accordance with the invention generally comprises providing a device useful in fusing together coupled mold sections defining a contact lens shaped cavity. The device 10 generally comprises an energy assembly 12 structured and effective to provide vibrational energy, for example ultrasound energy, and a contact assembly 14 operatively coupled to the energy assembly 12 and effective to transfer the vibrational energy from the energy assembly 12 to a pair of coupled mold sections forming a lens shaped cavity. Preferably, the contact assembly 14 is preferably structured to radiate vibrational energy into the coupled mold sections in such a manner so as to cause fusion at discrete, preferably spaced apart, regions between the coupled mold sections.

The contact assembly 14 comprises a horn 18 having a distal end structured to be couplable to or placeable on a contact lens mold assembly or a portion thereof. The horn 18 is preferably structured to be effective to transmit ultrasonic energy into the pair of mold sections so as to cause fusion or welding of discrete, spaced apart regions at interfacing surfaces of the mold sections.

The device 10 may further comprise a power supply 20 connected to the energy assembly 12. For example, the power supply 20 may be a power supply effective to convert 60 Hz line current to a frequency range from about 20 kHz to about 40 kHz by the use of solid state power devices. This high frequency electrical energy is supplied to a converter 22. The converter 22 changes the electrical energy into ultrasonic mechanical vibratory energy at the frequency of the converted electrical energy supply which is typically about 20 kHz to about 40 kHz.

The vibratory ultrasonic acoustical energy may then be transmitted through an amplitude modifying device or a booster 24. The booster 24 is a passive (i.e., non-powered) device which is used to modify the output amplitude of the converter 22 before it reaches the horn 18.

In at least one embodiment of the present invention, the horn 18 is structured to provide substantially discrete regions of vibratory energy, for example discrete regions of focused ultrasonics. For example, the horn 18 of the contact assembly 14 may be advantageously structured to contact, or more precisely, to be acoustically coupled with, only a portion of a circumferential area of the coupled mold sections.

For example, FIG. 1A shows a plan view of the distal end of the horn 18 shown in FIG. 1. In this embodiment, the contact assembly 14 includes a distal end 18a having protruding regions 18b spaced apart by recessed regions 18c. An area of acoustic coupling between the distal end 18a of the horn 18 and a pair of contact lens mold sections is not defined by a solid "ring" or circumferential region of acoustic coupling.

Figure 1B:
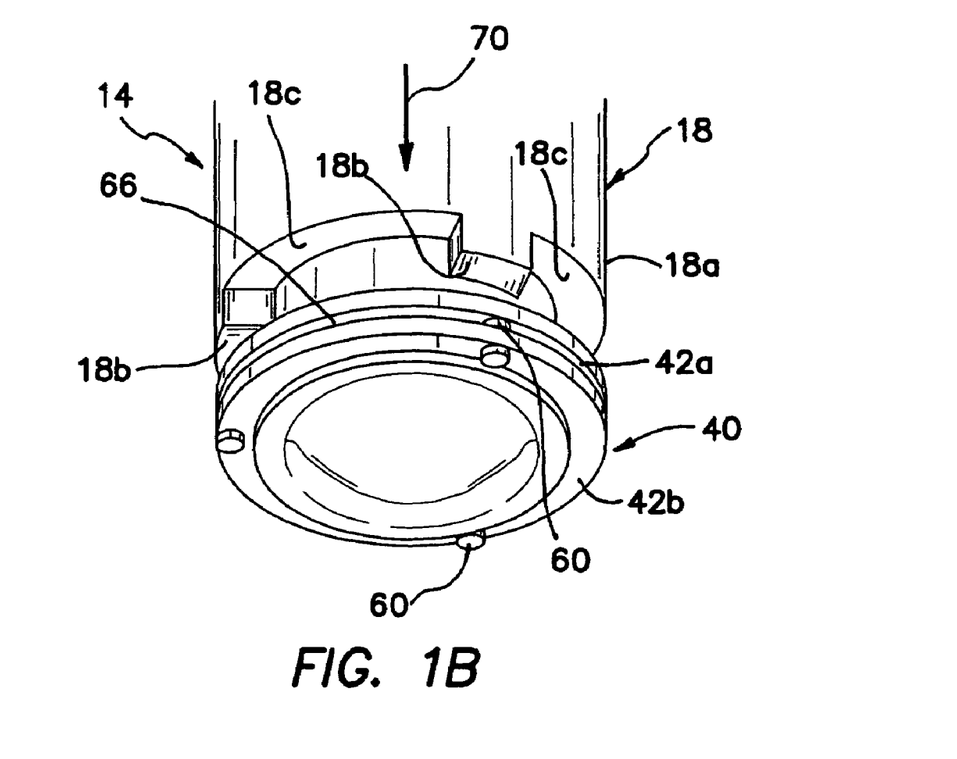
FIG. 1B is a perspective view of a portion of molding assembly, in accordance with another aspect of the invention, in alignment with the distal end of the device shown in FIG. 1 and 1A.

FIG. 1B shows the distal end 18a of the contact assembly 14 aligned with a contact lens molding assembly 40 comprising a pair of coupled contact lens mold sections 42a and 42b, in accordance with an embodiment of the invention. The somewhat "castellated" structure of the ultrasound horn 18 is effective to fuse together the mold sections 42a and 42b of molding assembly 40 at discrete, spaced apart locations generally at interfacing surfaces of the mold sections 42a and 42b. The structure of the distal end 18a of the horn 18 may be made by machining a distal end of a suitably sized conventional ultrasound horn, such as a horn that has a planar distal end surface, such as a continuous ring horn.

When the distal end of the horn 18 is placed in contact with the mold assembly 40 to be fused, only the distal end surfaces of the projecting regions 18b of the horn 18 are coupled to the molding assembly 40. Ultrasonic energy transmitted from the energy assembly (not shown in FIG. 1b, into the horn 18 and into the mold assembly 40 will be focused in discrete, spaced apart regions, for example, localized regions, within the molding assembly 40, generally as regions longitudinally aligned with the protruding regions 18b of the horn 18.

Although only three protrusions 18b are shown in FIG. 1A, it is to be appreciated that other embodiments of the invention may include less than three protrusions, or more than three protrusions. For example, in other embodiments of the invention, the distal end of the horn may include a single, non-annular protrusion, for example a protrusion having a substantially C-shaped cross section, effective to cause a non-annular region of fusion, for example a C-shaped region of fusion. As another example, an end view (similar to the view of FIG. 1A) of another embodiment of the invention having six protrusions 18b is shown in FIG. 1C.

In a preferred embodiment of the present invention, the mold assembly 40 and mold sections 42a and 42b thereof comprise polyethylene vinyl alcohol (EVOH) which is a suitable material for ultrasonic welding. It is to be appreciated that other materials may be used for making the lens mold sections of the present invention. For example such other materials include polymeric materials, for example thermoplastic polymeric materials, amorphous polymeric materials such as polystyrene, polycarbonate, acrylonitrile/butadiene/styrene compositions, cyclic olefin co-polymers, acrylics and polysulfone. Semicrystalline resins such as acetal, polypropylene, polyethylene, nylon, polyethylene terephthalate, polyether ether ketone, other polyolefins and liquid crystal polymers may also be joined with ultrasonic energy.

Several factors can affect the weldability of a material by vibrational energy, for example, ultrasonic energy. One factor is the melting or softening temperature of the mold section material, the higher the melt or softening temperature of a material the more energy is required to cause welding. Another is the stiffness of the material to be welded which generally influences the ability of the material to transmit energy to a joint interface. Typically, a stiffer material has better transmission capabilities.

Although the present invention is generally described herein as utilizing vibrational energy, more specifically, ultrasonic energy, to fuse or weld together contact lens mold sections, a number of other directed energy techniques and apparatus can alternatively or additionally be applied.

For example, linear vibration welding can be used with suitable mold materials to join mold sections together. Linear vibration welding is accomplished by an apparatus wherein the mold sections are held together with an appropriate force, one section held stationary while the other is vibrated in a direction perpendicular to the contact force direction. Friction generated by the vibration melts or softens the material at the point of contact and the sections fuse together. Typical frequencies of the linear vibration welding emitter are from 200 Hz to 300 Hz. Materials preferred for making mold sections suitable for linear vibration welding include polyamide, polystyrene or a composition containing polystyrene.

Another method for joining mold sections of a suitable material is hot plate welding which uses an apparatus containing a heated platen of controlled temperature and heat transfer where one of the sections to be molded is placed on or near the heated platen emitter. The surfaces of the mold section or sections are softened or melted and then quickly forced together in a press after removal from the platen. Materials preferred for hot plate welding and suitable for use as contact lens mold sections include polyethylene, polypropylene and polyvinyl chloride.

Another method and apparatus within the scope of the present invention is radio frequency welding wherein mold sections of suitable material are placed in the field of an emitter producing electromagnetic energy in a frequency, ranging from about 1 MHz to about 200 MHz. The electromagnetic energy increases the molecular vibration of certain molecules in the material to the point of creating sufficient heat to soften or melt the mold section. The mold sections are clamped together under pressure and the energy delivered is controlled to a specific depth or tailored to a specific material used as part of the lens mold section to cause the mold sections to fuse together. A preferred material suitable for making the lens mold sections for radio frequency welding is polyvinyl chloride.

Another method suitable for welding lens mold sections is an apparatus that emits and focuses infrared energy in discrete regions within a common plane, thereby melting or softening discrete, spaced apart regions within a particular plane of material but not softening the entire plane mold section. Focused infrared welding causes softening or melting of the lens mold material by the radiant energy. While the radiant energy source is in place or shortly after it is removed, the mold sections are clamped in a press until fused. Preferred lens mold materials suitable for focused infrared welding include polyethylene, polypropylene, polyvinyl chloride, polystyrene or a composition containing polystyrene.

In another aspect of the present invention, a mold assembly 40 is provided which is useful for making an ophthalmic lens, such as a silicone hydrogel contact lens. In yet another, related aspect of the invention, a mold section is provided which, upon being coupled with another mold section forms a mold assembly that can be fused together using ultrasonic energy.

Figure 2:
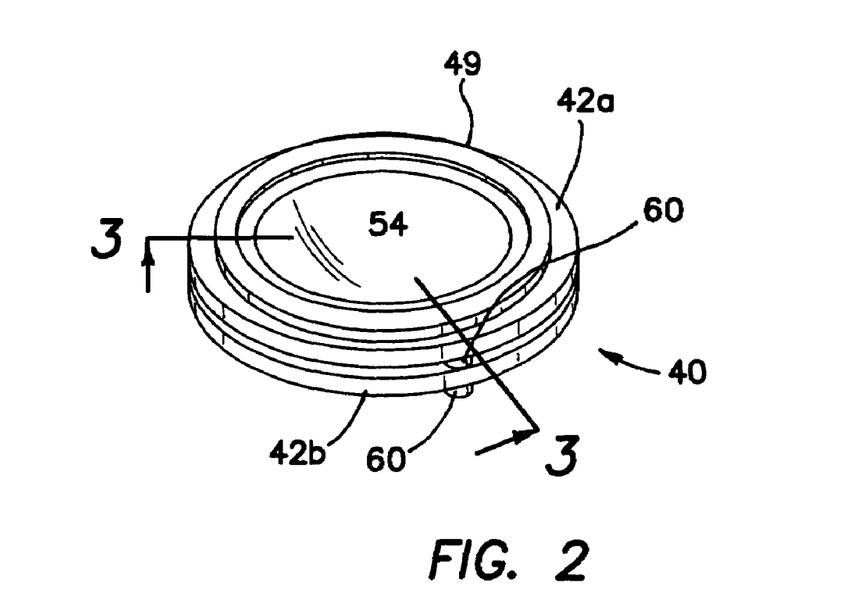
FIG. 2 is a perspective view of the portion of the molding assembly shown in FIG. 1B.
Figure 3:
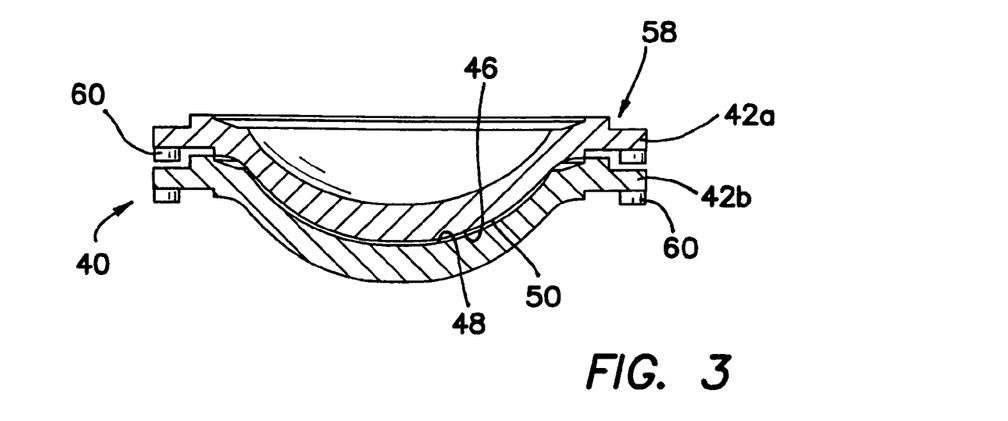
FIG. 3 is a cross-sectional view of the molding assembly taken along lines 3-3 of FIG. 2, the molding assembly being shown prior to ultrasonic fusion of the mold sections.

For example, the molding assembly 40 shown in FIG. 1B, and shown more clearly in FIGS. 2 and 3, generally comprises a first mold section 42a having a convex lens shaped region 46 and a second mold section 42b having a concave lens shaped region 48. The convex lens shaped region 46 is a negative of a posterior surface of an ophthalmic lens, and the concave lens shaped region 48 is a negative of an anterior surface of an ophthalmic lens. Before they are welded together, both of these mold sections 42a and 42b may be substantially identical in structure and form. The lens shaped region may also be referred to as a lens cup of a mold section.

FIG. 2 shows a top surface of the mold assembly 40. The first mold section 42a includes a flange region 49 which circumscribes the monomer filled lens shaped cavity within the mold assembly 40. It is this flange region 49 to which the ultrasound horn is preferably coupled or placed during the fusion of the mold sections 42a and 42b. As shown most clearly in FIG. 3, when the first mold section 42a is coupled with the second mold section 42b, the convex lens shaped region 46 of the first mold section 42a and the concave lens shaped region 48 of the second mold section define a monomer filled lens-shaped cavity 50.

Figure 4:
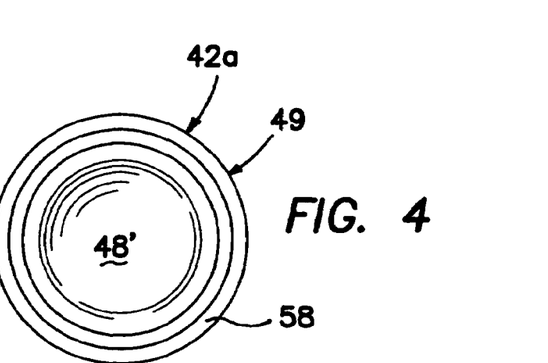
FIG. 4 is a top plan view of one mold section of the molding assembly shown in FIG. 2.
Figure 5:
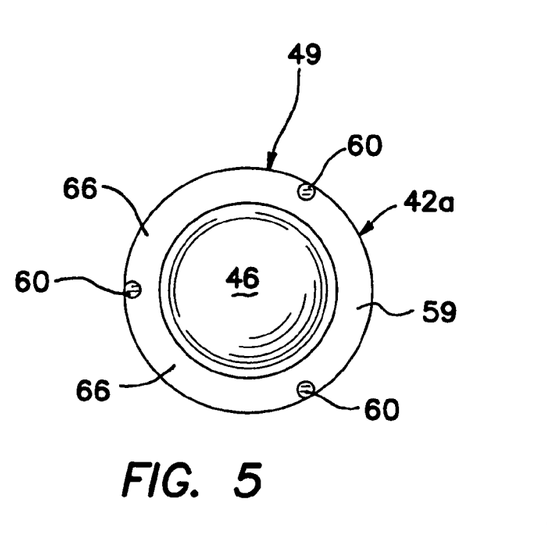
FIG. 5 is a bottom plan view of the mold section shown in FIG. 4, showing the mold section as including three spaced apart longitudinally extending projections.

FIG. 4 and FIG. 5 represent top and bottom views, respectively, of mold section 42a. It should be appreciated that FIGS. 4 and 5 could refer to mold section 42b, as mold section 42a and mold section 42b are substantially identical to each other, prior to fusion, in the embodiment shown.

Mold section 42a includes both a negative impression of a posterior surface of a lens and a negative impression of an anterior surface of a lens. For example, mold section 42a includes a concave lens defining surface 48' (shown in FIG. 4) that substantially opposes the convex lens defining surface 46 (shown in FIG. 5).

The flange region 49 which circumscribes the lens defining surfaces 46 and 48' generally comprises a first flange surface 58 circumscribing and located radially outwardly of the concave lens defining surface 48' (see FIG. 4). The flange region 49 further comprises a substantially opposing second flange surface 59 circumscribing and located radially outwardly of the convex lens defining surface 46 (see FIG. 5). In the illustrated embodiment, first flange surface 58 can be understood to be an upper surface or top surface of the mold section, and the second flange surface 59 can be understood to be a lower surface or bottom surface of the mold section.

In some embodiments, at least one of the first flange surface 58 and the second flange surface 59 includes a longitudinally extending projection, for example, one or more longitudinally extending projections such as shown in FIG. 1B, or alternatively, a longitudinally extending projection which is substantially annular and circumscribes the lens shaped surface.

For example, as shown in FIG. 1B, the longitudinally extending projections may comprise at least three individual, spaced apart projections 60 (hereinafter sometimes referred to as "pips 60"). In this particular embodiment, three pips 60 are provided, which are longitudinally extending projections located radially outwardly of only a portion of the convex lens defining surface 48. As shown in FIG. 5, the pips 60 are located on the second flange surface 59 which circumscribes the convex lens defining surface 46. The pips 60 are spaced apart and define areas of raised relief relative to portions of the radial surface between the pips 60. Although the pips 60 are shown as being generally circular in structure, the pips may alternately comprise linear areas of raised relief, or shapes other than circular. For example, the pips may comprise arcuate segments, each arcuate segment partially circumscribing the lens shaped surface. Many other shapes, sizes, and numbers of pips 60 may be provided wherein collectively the pips 60 do not define a complete circumference circumscribing the lens shaped surface, for example, the pips do not define a continuous, annular ring circumscribing the lens shaped surface.

The pips 60, or other longitudinally extending projections, may have a height of between about 0.2 mm and about 1.2 mm, preferably, about 0.6 mm measured from the surface of the flange between the pips 60. In the embodiment of the invention shown, the three pips 60 are circumferentially substantially equidistantly spaced about 120° apart from each other.

Turning briefly back to FIG. 2, the molding assembly 40 may comprise a pair of shaped "universal mold sections" in that the mold sections 42a and 42b are substantially identical. Each mold section 42a and 42b includes a plurality of pips 60, wherein the pips 60 of the first mold section 42a are in substantial alignment with the pips 60 of the second mold section 42b when the mold sections are assembled.

Figure 5A:
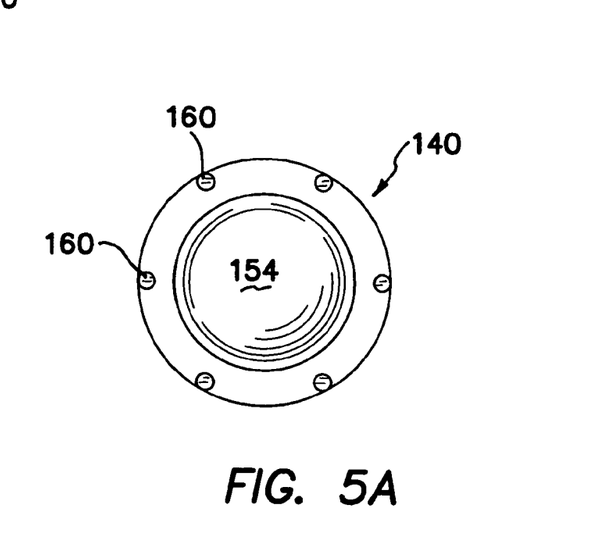
FIG. 5A is a bottom plan view of a mold section in accordance with another embodiment of the invention, wherein the mold section includes six spaced apart longitudinally extending projections.

FIG. 5A illustrates another mold section 140 in accordance with the present invention that is similar to mold section 40, except that mold section 140 is provided with six pips 160 (rather than three) located radially outwardly of the lens forming surface 154. This mold section 140 can be effectively fused in six regions defined by pips 160, using an ultrasound horn in accordance with the invention, having the distal end shown in FIG. 1c and described elsewhere herein.

It should be appreciated that mold sections in accordance with other embodiments of the invention may be provided with any number of pips having any suitable height, width, and shape. For example, the present invention may provide mold sections having less than three pips, more than three pips, for example, four pips or more.

Advantageously, each pip 60 is structured and positioned to be effective as a discrete or localized region of fusion between the mold sections 42a and 42b when ultrasonic energy is applied thereto.

Figure 6:
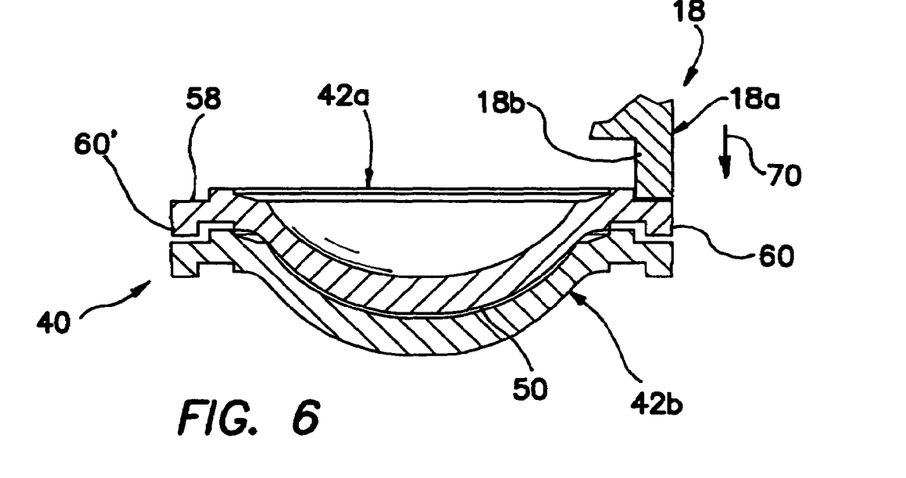
FIG. 6 is a cross sectional view similar to FIG. 3, in engagement with the distal end of the device shown in FIGS. 1 and 1b.

Purposes, aspects and advantages of the structures of the present invention, will be more clearly understood with reference to FIG. 1, 1B, and 6. As shown, the castellated ultrasound horn 18 of device 10 is structured to releasably fuse together the mold sections of an ophthalmic lens molding assembly, for example mold sections 42a and 42b of the molding assembly 40. The ultrasonic horn 18 may be sized and structured such that output region 18a of the horn 18 closely fits to the peripheral portion 58 of the mold section 42a. For example, the ultrasonic horn 18 may have an outer diameter about equal to the outer diameter of each of the mold sections 42a and 42b, for example about 20 mm in diameter. More preferably, the output region 18a of the horn 18 is sized and structured such that the projecting regions 18b will substantially align with the mold section projections 60.

Methods of making a contact lens are also provided by the present invention. For example, a method in accordance with the present invention generally comprises a step of providing a first mold section having a convex lens shaped surface and a flange region located circumferentially around the lens shape surface, and a second mold section having a concave lens shaped surface and a flange region located circumferentially around the lens shape surface. At least one of the first and the second mold sections includes a projection, for example, a substantially annular projection circumscribing the lens shaped region, or alternatively, a plurality of spaced apart projections such as described elsewhere herein. The method further comprises providing a monomer component in the concave lens shaped surface of the second mold section and assembling the mold sections together such that at least a portion of the flange region of one of the mold sections is in substantial contact with at least a portion of the flange region of the other one of the mold sections.

More specifically, the first and second mold sections are coupled together so that the one or more longitudinally extending projection or projections are located between the mold sections and provide contact points between the mold sections. The method further comprises applying vibrational energy, for example, ultrasonic energy, to one or more discrete regions of the coupled first and second mold sections including at least a portion of the one or more projections in order to soften and fuse the first and second mold sections together in discrete, spaced apart regions, preferably, the regions of fusion not combining to define a complete annular region of fusion around the lens shaped cavity. The method can further include the step of causing the monomer component in the lens-shaped cavity to polymerize to form a lens product.

For example, referring now specifically to FIGS. 1B and 6, a mold assembly 40 is provided, where the mold assembly comprises two similar or identical "universal" mold sections that each include both male and female molding surfaces. Each mold section 42a and 42b each includes three equidistantly spaced apart projections or pips 60. In this embodiment, the ultrasound horn 18 is positioned on the assembly 40 so as to align projecting regions 18b of the horn 18 with the pips 60. The mold section 42a proximate the ultrasonic horn 18 vibrates with the acoustical energy emitted from the ultrasonic horn 18. The other mold section 42b is held in a relatively fixed position so that a relative motion of the mold sections 42a and 42b at the interface takes place at the pips 60. The mold assembly can be restrained in any suitable manner during the welding process. Vibratory energy at discrete regions of the molding assembly 40 that includes the pips 60 is converted to heat through friction, which softens and deforms the plastic material of the assembled mold sections, thereby causing the pips 60 to soften.

Turning now specifically to FIG. 1B, it can be appreciated that regions 66 located between the pips 60 (which generally align with recessed regions 18c of the horn 18) are not exposed to any significant level of vibratory energy, and thus these regions 66 are not fused together, or at least are not fused together to any significant degree.

When the softened state is reached at the mold section projections 60, the acoustic vibration may be stopped. Pressure may be maintained briefly on the mold assembly (in the direction of arrow 70 in FIGS. 1B and 6) while the polymeric material solidifies to create a molecular bond between the mold sections 42a and 42b at discrete, spaced apart regions. The entire cycle may be accomplished in a very short time. For example, in some embodiments of the invention, fusion between the sections is accomplished from about 0.3 seconds to about one second. The strength of the bond in the discrete regions is approximately that of the parent material, particularly because with a thermoplastic material, the melting and subsequent solidifying of the material does not substantially affect the mechanical properties thereof.

As can readily be appreciated by one in the field of ophthalmic lenses, it is important that the mold sections 42a and 42b be properly aligned relative to each other.

Figure 7:
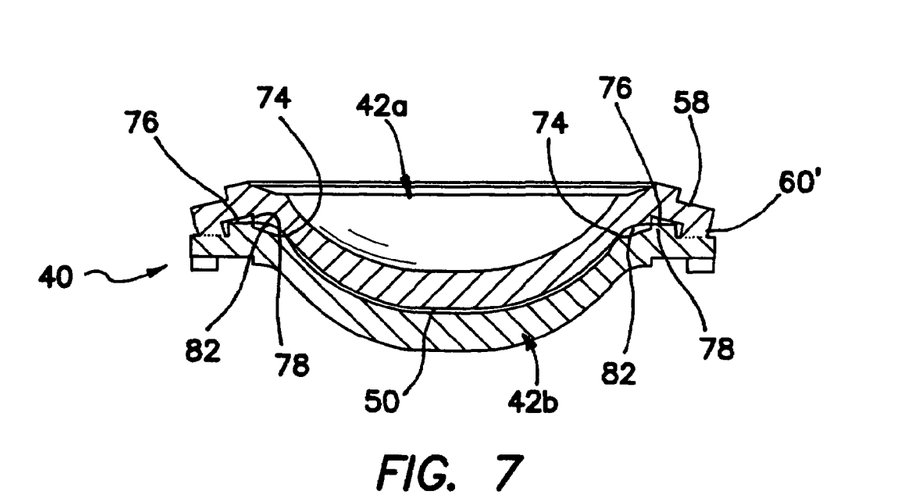
FIG. 7 is a cross sectional view similar to FIG. 6, showing the molding assembly after being fused with the device shown in FIGS. 1 and 1B.

Turning now to FIG. 7, the molding assembly 40 comprising the fused mold sections 42a and 42b is shown. Melted pips 60' of mold section 42a have solidified and provide discrete, spaced apart regions of fusion between the mold sections 42a and 42b.

The filled cavity 50 between the fused mold sections 42a and 42b preferably has not been altered through the fusion process. Typically, it is not desirable to cause any deformation of the monomer filled cavity 50. Protrusion 74 of mold section 42b makes intimate contact with mold section 42a forming the lens peripheral edge without deformation or fusion of protrusion 74. Another protrusion, for example, annular protrusion 76, located radially outwardly of protrusion 74, is also provided as shown. In some embodiments of the invention, this structure provides an interference fit against a structure 78 of the adjacent mold section 42a, and/or this structure is useful for facilitating proper alignment of the mold sections upon assembly thereof. The annular protrusion 76 stabilizes the position of mold sections 42a and 42b with respect to each other.

The molding assemblies of the present invention are advantageously structured as providing a means of ultrasonically fusing the mold sections 42a and 42b without causing any significant negative effects that may be caused as a result of ultrasonic energy being transmitted to the monomer filled cavity 50. For example, it is desirable to apply the vibratory energy at a location apart from the cavity 50 so as to not cause cavitation of the polymerizable composition. Advantageously, protrusion 74 and protrusion 76 define a flash retaining area 82 located between the pips 60' and the filled cavity 50. Further description of another suitable structural arrangement for a flash retaining area is provided in Morris, U.S. Pat. No. 6,405,993.

Figure 8:
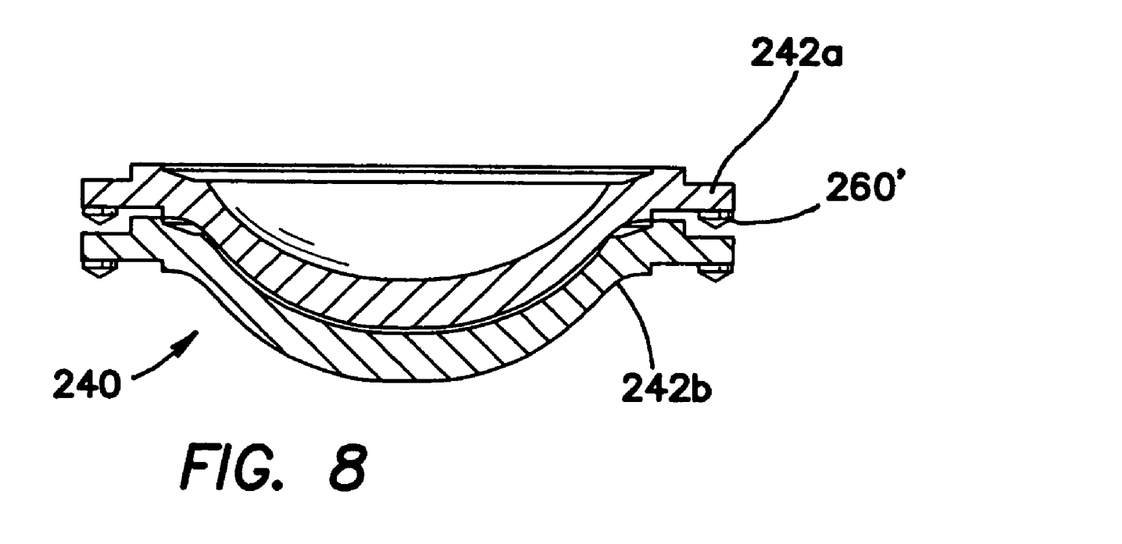
FIG. 8 is a cross-sectional view of another molding assembly in accordance with the invention.
Figure 9:
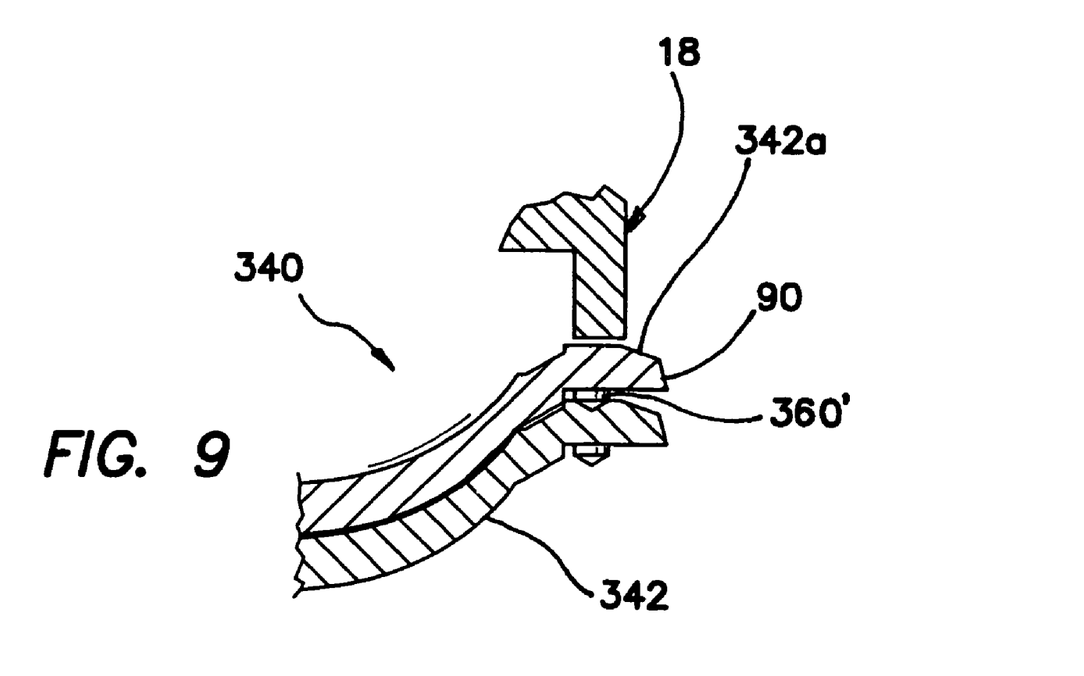
FIG. 9 is a cross-sectional view of a further molding assembly in accordance with the invention.

Alternative molding assemblies 240 and 340 are shown in FIGS. 8 and 9 respectively. These molding assemblies 240 and 340 are substantially similar to molding assembly 40, with the primary difference being the shape of the pips and the location of the pips. More specifically, molding assembly 240 includes mold sections 242a and 242b that are substantially identical to one another, and include tapered or conical pips 260', in that the pip 260' has a first end secured directly to the mold section body 242a and a second end extending longitudinally from the first end, and a cross-section at the first end is larger than a cross-section at or near the second end. Molding assembly 340 includes mold sections 342a and 342b that are substantially identical to one another, and include tapered or conical pips 360' similar to pips 260' but located further inwardly of the outer peripheral edge 90 of the mold section 342a.

One of the advantages of the molding assembly 340 is that the female side of the top mold section 342a has a peripheral region above the pip 360' that may more easily accommodate the castellated horn 18.

The polymerizable composition may be supplied to the cavity either by a conventional, two-part sprue and riser, or the sections may be joined or held in place under vacuum and the monomer injected into a port. The polymerizable composition can be dispensed onto the concave lens shaped female mold surface using a pipette or syringe. The mold section 42b may be supplied with a monomer mixture such as a silicon hydrogel forming mixture or any monomer mixture that can be used for contact lenses such as gas permeable, conventional hydrogel material, or any implantable lens device and the mold sections 42a and 42b then welded or fused as described elsewhere herein. The polymerizable composition is polymerized by suitable means such as exposure to ultraviolet light or thermal cure for a suitable length of time, as is known in the art.

Figure 9A:
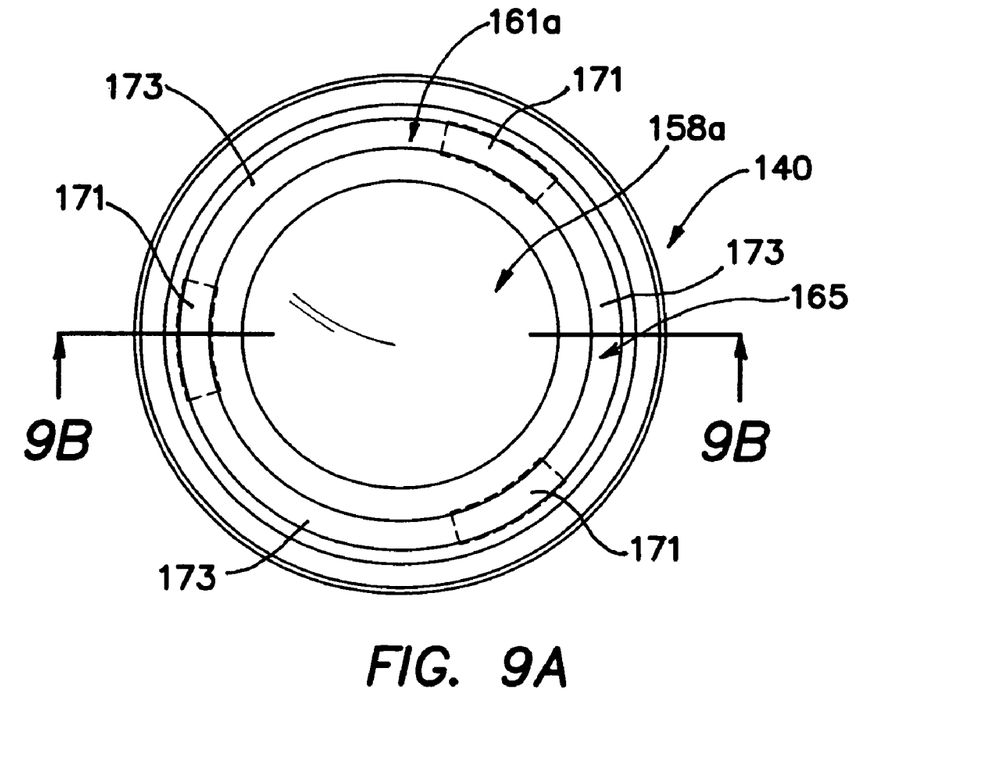
Figure 9B:
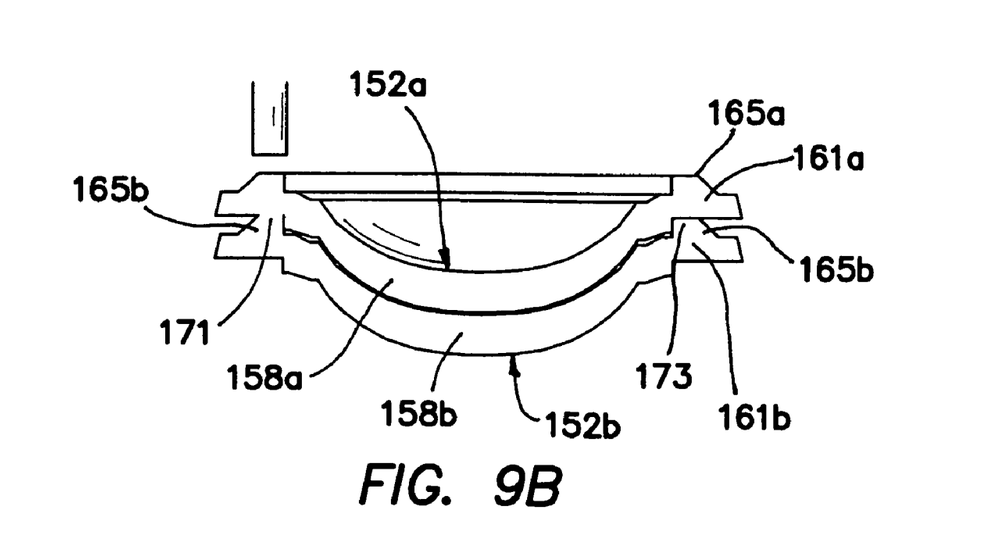

Another molding assembly useful for manufacturing contact lenses in accordance with another aspect of the invention is shown generally at 140 in plan view in FIG. 9a and in cross section in FIG. 9b. Unless stated otherwise herein, mold assembly 140 is substantially the same as or identical to mold assembly 40. Like mold assembly 40, mold assembly 140 comprises two "universal" mold sections 152a and 152b. Each mold section 152a and 152b includes an optic region 158a and 158b respectively, having a convex male molding surface and a substantially opposing concave female molding surface. Each mold section 152a and 152b includes a flange region 161a and 161b circumscribing the optic region 158a and 158b respectively.

The primary difference between mold assembly 140 and mold section 40 is that universal mold sections 152a and 152b, includes a substantially annular longitudinally extending projection 165 suitable for fusing, instead of a plurality of spaced apart pips 60. As shown, the annular projection 165b of mold section 152b is fused with a portion of flange region of mold section 152b in discrete, spaced apart locations such as shown (by dashed lines in FIG. 9a) as fused or welded regions 171 along substantially annular projection 165b. Referring as well to FIG. 9B, the welded portions 171 along projection 165b are separated by regions 173 of no fusion or welding. These regions 173 of no fusion or welding are defined by surface portions of projection 165b which contact or face but are not bonded to, a corresponding surface portion of the flange region 161a of the other mold section 152a. The fused regions 171 are preferably made by using the contact assembly 14 of device 10 to create the discrete regions of fusion. The contact assembly 14 of device 10 is shown and described elsewhere herein, having the castellated structure (shown most clearly in FIG. 1b).

Figure 10A:
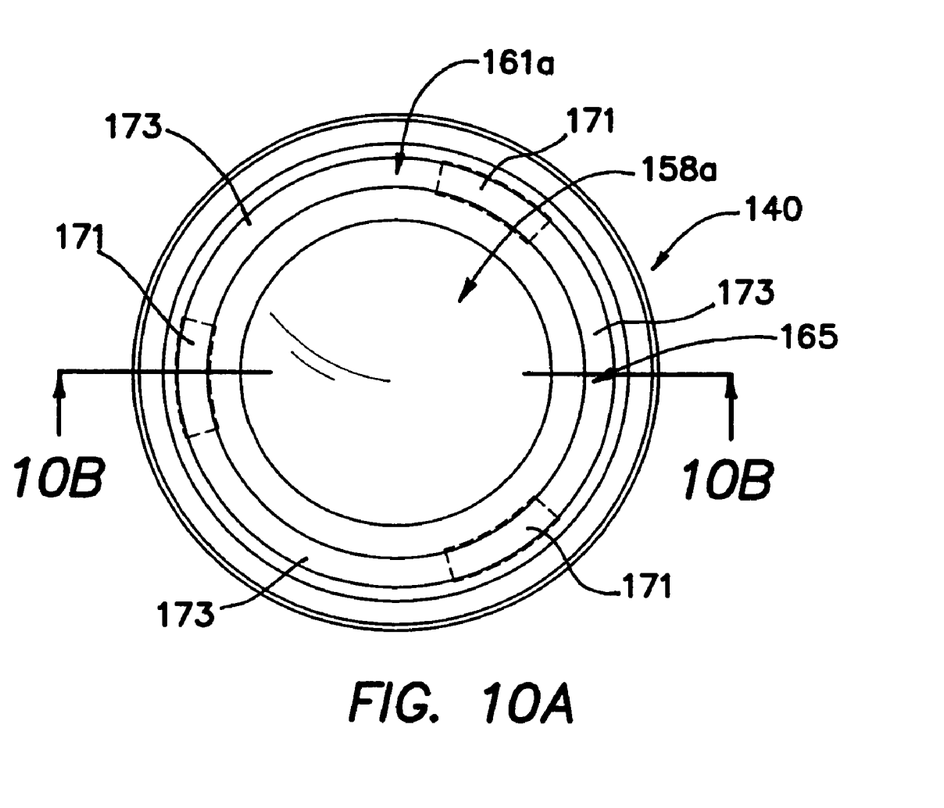
FIGS. 10A and 10B are a top view and a cross sectional view, respectively, of a molding assembly in accordance with another embodiment of the invention, wherein the molding assembly includes a pair of mold sections each having three space apart recessed regions providing gaps between regions of fusion between the mold sections, wherein gaps are indicated by dashed lines in FIG. 10A.
Figure 10B:
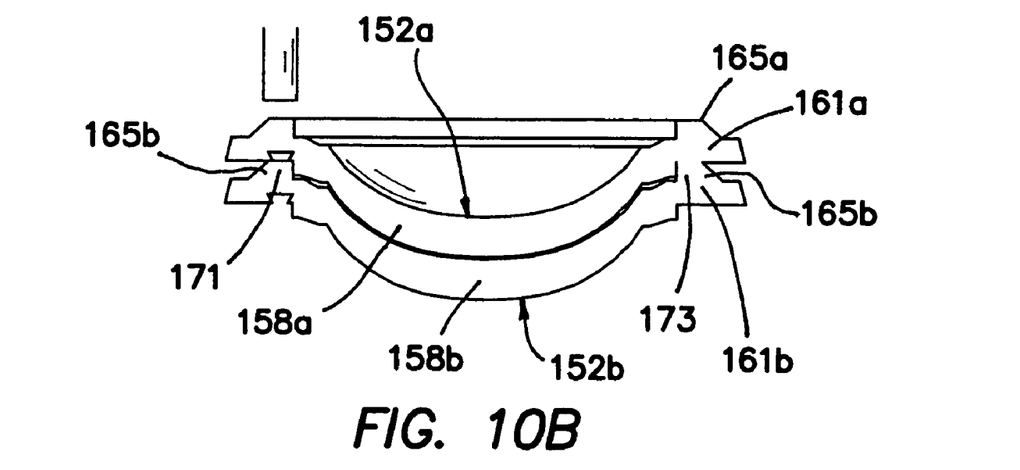

One specific example of a mold assembly is illustrated in FIG. 10A and FIG. 10B. In this embodiment, the features of the mold assembly 140 are similar to the embodiment of FIG. 9A and 9B except that regions 171 (indicated in dashed lines) are gaps or regions that are not welded or fused, and regions 173 are welded. In this embodiment, the flange surface comprises an annular ridge 165 circumscribing the lens shaped cavity on the upper surface of the flange. The lower surface of the flange comprises a plurality of recesses 171 extending into the flange region. When a first mold section is placed on a second mold section, the lower surface of the flange of the first mold section is in contact with the upper surface of the annular ridge. The annular ridge facilitates stacking of the lens cups prior to mold assembly formation and during mold assembly formation. The annular ridge may also effectively reduce prisming of the lens forming material, such as the monomer composition, during the formation of the mold assembly.

An ultrasonic horn can be placed in contact with the upper surface, such as the flange, of the first mold section. The ultrasonic horn delivers ultrasonic energy and causes the first mold section to fuse to the second mold section. The fusion of the two mold sections is non-continuous around the lens cup or the flange region of the mold section. This non-continuous fusion can be achieved using a conventional ultrasonic horn having a substantially planar distal end surface, such as a continuous ring ultrasonic horn, or can be achieved using a castellated ultrasonic horn, as disclosed herein. The fusion can occur on the outer edge of the ridge, or it can occur on the top surface of the ridge and include a portion of the outer edge, or the fusion may include a portion of the inner edge of the ridge.

The discontinuous fusion of the first mold section to the second mold section can provide substantial benefits relative to other types of mold assemblies, such as mold assemblies that have a continuous fusion ring around the lens cup. For example, fusing the present mold sections having recesses located in a flange surface using an ultrasonic horn can be achieved with little if any opacification, pitting, or bubbles forming in the lens cup.

Even though the fusion of the two mold sections may be discontinuous, the two mold sections are securely fixed to each other such that the mold sections are not easily separated during further manufacturing steps.

Furthermore, as discussed herein, in embodiments which do not utilize ultrasonic energy to attach one mold section to another mold section, the fusion zone or contact region can be continuous around the lens cup. For example, if a first mold section engages a second mold section by an interference fit between the two mold sections, the contact can be a continuous contact region. Similarly, if the first and second mold sections are attached to each other by plates or other clamping devices, the contact region can be a continuous structure.

Figure 11:
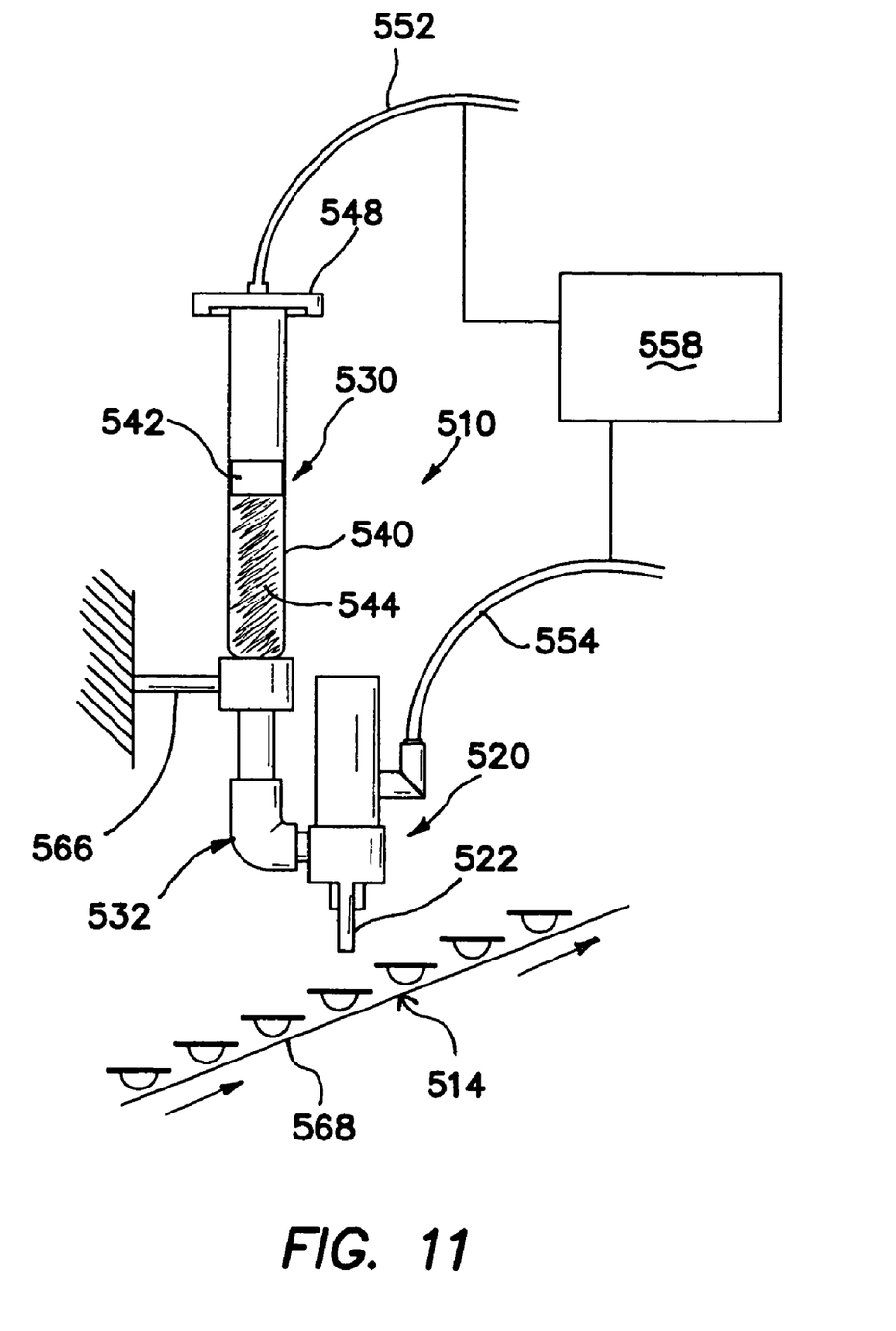
FIG. 11 is a schematic view of a monomer dispense system in accordance with another aspect of the invention.

Turning now to FIG. 11, the present invention further provides an apparatus 510 useful for providing a monomeric composition, such as a silicone hydrogel lens precursor material, in a contact lens shaped cavity of a contact lens molding assembly 514. The contact lens shaped cavity is preferably a concave lens shaped cavity of a mold section such as described and shown elsewhere herein in accordance with other aspects of the present invention. It will be appreciated that apparatus 510 may also be utilized for providing a monomer composition to conventional contact lens mold halves.

The apparatus 510 generally comprises a dispensing unit 520 having a dispense tip 522 sized and structured to dispense an amount of a monomer composition onto a contact lens shaped surface of a mold section, and a syringe assembly 530 for directing the monomer composition to the dispensing unit 520. The syringe assembly 530 is directly coupled to the dispensing unit 520 as shown, for example by means of fitting 532. Fitting 536 may comprise an elbow joint or similar coupler structured to facilitate coupling and uncoupling of the syringe assembly 530 from the dispensing unit 520.

The dispensing unit 520 may comprise a pneumatically operated diaphragm valve.

In a specific example, the syringe assembly 530 comprises a barrel 540 and a piston 542 inserted therein. For dispensing light-initiated monomers, for example, in order to produce silicone hydrogel lenses, the syringe assembly 530 is preferably a UV blocking or filtering syringe, for example a syringe assembly which blocks about 95% to 100% UV radiation. In one embodiment, the barrel 540 of syringe assembly 530 holds about 55 cc of monomer composition 544. A non-UV blocking syringe assembly can be used when the monomer composition being dispensed is not UV reactant.

Prior to use thereof, the syringe assembly 530 is filled with the monomer composition while the piston 542 is in a fully inserted position in order to ensure that no air is trapped in the barrel 540. The syringe assembly 530 and cap 548 are designed to protect the monomer composition from contamination by particles and the like, and also from taking in oxygen. After the barrel 540 is filled, a cap 548 is then placed on the barrel 540. The cap 548 is locked to the barrel using a luer lock mechanism. The filled syringe assembly 530 can then be stored until it is required.

It is important that the monomer composition is not contacted with air prior to being dispensed into the mold assembly, as contact with air could cause bubbles/voids in the final contact lens product. It is desirable therefore, to purge the monomer composition, for example, using nitrogen or other inert gas in order to exclude oxygen from the monomer composition prior to the composition being deposited into the syringe assembly 530. The filled syringe assembly is stored in a water-cooled jacket effective to keep the monomer composition at a desired temperature of between about 4° C. and about 36° C. In certain embodiments, the monomer mixture can be kept at a substantially constant temperature, such as room temperature, for example, between about 20° C. and about 25° C., for example, between 20° C. and 22° C.

In a specific example, the apparatus 510 comprises an "EFD CLT" valve dispensing unit, and having Part No. 752V-CLT-E, and an amber 55 cc syringe and piston set having Part No. 5113LBP-B, both being manufactured by EFD Inc., East Providence, R.I. 02914 USA. Suitable components are also available from a company called PPG Industries, for example, pale blue 55 cc syringes Part No. 365523 and piston Part No. 363035. Both varieties are UV blocking and have the same luer lock attachment.

In a specific example, the dispense unit 520 holds an amount of monomer composition sufficient to make about three contact lenses. The plunger 542 operates pneumatically by means of air pressure line 552. The dispensing unit 520 is connected to air pressure line 554.

Apparatus 510 includes a valve controller 558 which is structured to control valve open times for at least one of, and preferably both of, the syringe assembly 530 and the dispensing unit 520. The valve controller 558 is preferably microprocessor-based and programmed to reliably and precisely open and close the valves of the apparatus 510. A suitable valve controller is marketed under the name '7000 VALVE-MATE Controller' and is available from EFD, Inc. Alternatively, separate valve controllers may be provided for controlling the syringe assembly 530 and dispense unit 520.

After the one or more increments of monomer composition have been dispensed through the dispense tip 522, the dispense unit 520 draws more monomer composition from the syringe assembly 530 through the elbow joint 532. When effectively all the monomer composition 544 in the syringe barrel 540 has been spent, the syringe assembly 530 is disconnected from the dispense unit 520 and replaced with a new monomer-filled syringe assembly. This may be accomplished by locking off the air line 552 that feeds the cap 548 on top of the syringe assembly 530 and removing the cap 548. The syringe assembly 530 is then simply unscrewed from the elbow coupler 532 and a new, pre-filled syringe assembly 530 with a piston already in place, is connected to the elbow joint coupler 532. Cap 548 is then placed on the new syringe assembly and locked. The air is then released into line 552. This changeover takes only a few seconds to accomplish.

The apparatus 510 may be mounted in such a way, for example, by a bracket 566, so as to remain stationary with respect to a moving table 568 or conveyor carrying mold assembly sections 514 to be filled. The functioning of the entire apparatus 510 and the moving table 568 may be controlled by automation.

In view of the disclosure hereinabove, one example of a method of filling a mold section and forming a mold assembly for producing a contact lens can be described as follows. The following is provided by way of example only, and should not be construed to limit the invention in any way.

A cassette which comprises eight stacks of sixty-four mold sections is transferred from a molding/demolding module to the present filling module or system described herein.

The cassette is placed on a frame assembly. The frame assembly is structured to direct the mold sections to a surface of a plate. More specifically, the frame assembly includes components to incrementally move the mold sections so that the upper mold section in each stack is located on substantially the same plane or at the same height. By positioning the top most mold section at the same height or in one plane, a robotic plate can be used to remove and transfer the mold sections, eight at a time.

In one embodiment, the frame assembly includes one or more biasing members that are effective in moving the stacks of mold sections. For example, the frame assembly can comprise a plurality of spring loaded cylinders or pneumatic controlled cylinders. The biasing member(s) urges the mold sections through a hole in a plate. In the illustrated embodiment, the mold sections have an extension member or pan handle extending radially outward from the lens cavity or flange. The extension member is oriented toward the center of an array of four lens mold sections (2×2). The mold sections are urged or pressed against a bar or other structure extending over a portion of the holes of the plate. The bar functions as a stop as the mold sections are urged toward the plate surface.

A robotic arm located between the two sets of four mold sections moves between the extension members so that the extension members are oriented away from the center of the array. A robotic controlled vacuum device picks up the mold sections and transfers the individual mold sections to a nesting apparatus. A nest containing the mold sections is passed to the dispensing apparatus described herein. Air is used to drive the syringe piston and dispense a monomer composition in to the concave lens cavity of a mold section. The volume of the dispensed monomer composition is usually about 20 µL to about 50 µL per mold section.

The nest with the filled mold section or sections is moved to a station where a second unfilled mold section is placed on top of the first filled mold section, as discussed herein, to form a mold assembly containing a lens precursor material. The nest with the mold assemblies is moved to a welding station where an ultrasonic delivery device uses 40 kHz ultrasonic energy to fuse the two mold sections together. During the welding, excess monomer mixture can be removed from the mold sections and discarded.

The mold assemblies (the fused mold sections) are then placed on a loading tray which has a plurality of holes to accommodate the lens cup of the lens mold assemblies. The holes are offset between rows so that the extension members do not interfere with each other on the tray. Each tray can hold 256 mold assemblies. Other configurations are also possible.

The foregoing methods can include one or more identification or tracking steps, such as by scanning an identifier provided on the extension member of the mold sections. The methods may also include one or more inspection steps, such as inspecting for air bubbles in the monomer composition prior to fusing or closing the mold sections.

The foregoing methods may also include a step of dipping or contacting the second mold section with the monomer composition prior to placing the second mold section on the first mold section containing the monomer composition in the lens cup.

The tray of mold assemblies can then be transferred to a curing station where the polymerizable composition is polymerized or cured, for example by exposing the mold assemblies to ultraviolet light.

Certain aspects and advantages of the present invention may be more clearly understood and/or appreciated with reference to the following commonly owned United States Patent Applications, filed on even date herewith, the disclosure of each of which is being incorporated herein in its entirety by this specific reference: U.S. patent application Ser. No. 11/200,848, entitled "Contact Lens Molds and Systems and Methods for Producing Same"; U.S. patent application Ser. No. 11/200,644, entitled "Systems and Methods for Producing Contact Lenses from a Polymerizable Composition", ; U.S. patent application Ser. No. 11/201,410, entitled "Systems and Methods for Removing Lenses from Lens Molds"; U.S. patent application Ser. No. 11/200,863, entitled "Contact Lens Extraction/Hydration Systems and Methods of Reprocessing Fluids Used Therein", ; U.S. patent application No. 11/200,862, entitled "Contact Lens Package"; U.S. Patent Application No. 60/707,029, entitled "Compositions and Methods for Producing Silicone Hydrogel Contact Lenses"; and U.S. patent application Ser. No. 11/201,409, entitled "Systems and Methods for Producing Silicone Hydrogel Contact Lenses".

A number of publications and patents have been cited hereinabove. Each of the cited publications and patents are hereby incorporated by reference in their entireties.

Although certain preferred embodiments have been described herein, it is understood that the invention is not limited thereto and modifications and variations would be evident to a person of ordinary skill in the art.

What is claimed is:

1. A method of making contact lenses comprising:
   providing a plurality of first and second mold sections, each mold section including a lens shaped surface and a flange region circumscribing the lens shaped surface, each first mold section includes a substantially annular circumferential projection extending axially from the flange region and a plurality of circumferential recessed regions not completely encircling the lens shaped surface of the first mold section extending axially into the flange region toward the substantially annular projection wherein the first mold sections are provided in a cassette comprising stacks of mold sections;

placing the cassette in a frame assembly structured so that an upper-most mold section in each stack is located on substantially the same plane;

transferring the first and second mold sections to a nesting apparatus;

dispensing a polymerizable composition on the lens shaped surface of the first mold sections located in the nesting apparatus;

coupling together the first and second mold sections so that each of the coupled mold sections defines a lens shaped cavity between the lens shaped surface of one of the mold sections and the lens shaped surface of the other mold section and the flange region of the first mold section is in contact with the flange region of the second mold section;

fusing the coupled mold sections to form a plurality of circumferential fused regions not completely encircling the lens shaped surfaces of the coupled mold sections between the flange regions; and causing the polymerizable composition in the lens shaped cavities to polymerize.

2. The method of claim 1 wherein the step of fusing includes applying energy to the coupled first and second mold sections.

3. The method of claim 2 wherein the energy is ultrasonic energy.

4. The method of claim 1 wherein the first and second mold sections are substantially identically configured.

5. The method of claim 2 wherein the fusing step is conducted so that the first and second mold sections are fused together along contact regions of interfacing flange surfaces, and so that the contact regions being spaced apart by gaps defined by the plurality of circumferential recessed regions in one of the flange regions.

6. A contact lens mold assembly, comprising a first mold section having a lens shaped surface which is a negative of an anterior surface or a posterior surface of a contact lens, a flange region circumscribing the lens shaped surface, a substantially annular, circumferential projection substantially circumscribing the lens shaped surface on the flange region and a plurality of circumferential recessed regions not completely encircling the lens shaped surface of the first mold section extending axially into the flange region;

a second mold section substantially identically structured to the first mold section, the second mold section being fused to the first mold section at a plurality of circumferential fused regions not completely encircling the lens shaped surface of the first mold section between the flange regions of the first and second mold sections and not being fused to the first mold section at the plurality of recessed regions; and a polymerizable composition on the lens shaped surface.

7. The mold assembly of claim 6 wherein the plurality of recessed regions of each of the first and second mold sections extend axially into the flange region in a direction toward the substantially annular, circumferential projection.

* * * * *